United States Patent
Chiba et al.

(10) Patent No.: US 9,353,230 B2
(45) Date of Patent: May 31, 2016

(54) RESIN PELLET AND METHOD FOR PRODUCING THE SAME

(71) Applicant: Du Pont-Mitsui Polychemicals Co., Ltd., Tokyo (JP)

(72) Inventors: Kazuyuki Chiba, Chiba (JP); Izumi Sasai, Chiba (JP)

(73) Assignee: Du Pont-Mitsui Polychemicals Co., Ltd., Tokyo (JP)

( * ) Notice: Subject to any disclaimer, the term of this patent is extended or adjusted under 35 U.S.C. 154(b) by 204 days.

(21) Appl. No.: 14/152,141

(22) Filed: Jan. 10, 2014

(65) Prior Publication Data

US 2014/0127403 A1  May 8, 2014

Related U.S. Application Data

(62) Division of application No. 13/376,201, filed as application No. PCT/JP2010/003920 on Jun. 14, 2010, now abandoned.

(30) Foreign Application Priority Data

Jun. 19, 2009 (JP) ................. 2009-146065

(51) Int. Cl.
*C08J 3/12* (2006.01)

(52) U.S. Cl.
CPC .............. *C08J 3/124* (2013.01); *C08J 2323/08* (2013.01); *Y10T 428/2991* (2015.01)

(58) Field of Classification Search
None
See application file for complete search history.

(56) References Cited

U.S. PATENT DOCUMENTS

| | | | |
|---|---|---|---|
| 5,041,251 | A | 8/1991 | McCoskey et al. |
| 6,852,787 | B1 | 2/2005 | McMichael et al. |
| 2009/0057935 | A1* | 3/2009 | Sato .................. B29B 9/065 264/5 |

FOREIGN PATENT DOCUMENTS

| | | |
|---|---|---|
| JP | 1-288408 | 11/1989 |
| JP | 02-024130 | 1/1990 |
| JP | 5-508116 | 11/1993 |
| JP | 7-316311 | 12/1995 |
| JP | 9-077890 | 3/1997 |
| JP | 2002-338939 | 11/2002 |
| JP | 2003-89774 | 3/2003 |
| JP | 2007-153979 | 6/2007 |
| JP | 2008-013727 | 1/2008 |
| JP | 2008-044183 | 2/2008 |
| JP | 2008-248015 | 10/2008 |
| WO | 2006-117963 | 11/2006 |
| WO | 2008-013266 | 1/2008 |

OTHER PUBLICATIONS

International Search Report dated Aug. 3, 2010.
International Preliminary Report on Patentability and Written Opinion dated Jan. 17, 2012.
Henderson, A.M. "Ethylene-Vinyl Acetate (EVA) Copolymers: A General Review." IEEE Electrical Insulation Magazine vol. 9, No. 1 (Jan./Feb. 1993): pp. 30-38.
Machine Translation of JP2007-153979 translated Apr. 12, 2013.
US Office Action dated Apr. 24, 2013 filed in related U.S. Appl. No. 13/376,201.

* cited by examiner

*Primary Examiner* — Erma Cameron
(74) *Attorney, Agent, or Firm* — Rankin, Hill & Clark LLP

(57) ABSTRACT

A resin pellet of the present invention includes a resin base material and a plurality of microparticles embedded in the resin base material. The resin pellet is covered with the plurality of microparticles on the surface of the resin base material. According to the present invention, it is possible to prevent detachment of the microparticles to be applied on the resin base material and to effectively suppress blocking of resin pellets.

8 Claims, 3 Drawing Sheets

(a)

(b)

RESIN PELLET AND METHOD FOR PRODUCING THE SAME

TECHNICAL FIELD

This application is a divisional application of U.S. patent application Ser. No. 13/376,201, filed Dec. 5, 2011, which is a National Phase Application of International Application No. PCT/JP2010/003920, filed Jun. 14, 2010, which claims the priority of Japan Patent Application No. 2009-146065, filed Jun. 19, 2009, all of which are incorporated herein by reference. The present invention relates to a resin pellet and a method for producing the resin pellet.

BACKGROUND ART

In the past, blocking of resin pellets has been a problem, so that various measures have been taken.

Patent Document 1 discloses that anti-adhesive powder is attached on the surface of EVA particles in a post-treatment step of the manufacturing process of resin pellets having ethylene-vinyl acetate copolymer particles as a base material by feeding EVA particles which have been cut in water into a transportation tube, and contacting with an anti-adhesive powder slurry in the transportation tube. It is described to be found that blocking is not occurred by such a manner even though a large amount of resin pellets are accumulated in a large hopper.

Patent Document 2 discloses that EVA microparticles is attached on the surface of EVA particles in a post-treatment step of the manufacturing process of resin pellets having EVA particles as a base material by adding an aqueous EVA dispersion into circulating water used for transportation of EVA particles, and the resulting resin pellets are further attached EVA particles even in the step of free feeding of resin pellets by spraying the aqueous EVA dispersion. In this manner, it is described that decrease in anti-blocking performance due to detachment of EVA microparticles in a free feeding pipe of resin pellets is suppressed, and reduction of the pressure loss and pinching of resin pellets to a rotary valve fitted in the free feeding pipe are prevented.

Patent Document 3 discloses a poor crystalline copolymerized polyester resin pellet having a glass transition point of equal to or more than 40 degrees centigrade. This resin pellet is coated with a powder layer of a copolymerized polyester resin having a glass transition point of equal to or more than 40 degrees centigrade and an average particle size of equal to or less than 35 μm, and capable of being dissolved in a general-purpose solvent. In this manner, it is described in such a manner that blocking of pellets is prevented, blocking is not occurred over a long period of time and the solution stability is excellent even though the resin is dissolved in a general-purpose solvent.

Patent Document 4 discloses that the emulsion polymer latex and the hardened tallow fatty acid are respectively attached to polymer particles by mixing an emulsion polymer latex to a slurry containing a (meth)acrylic block copolymer before mixing a hardened tallow fatty acid thereto, and heating at a predetermined temperature. In this way, it is described that blocking of adhesive resin pellets having a small hardness is thus suppressed.

Patent Document 5 discloses a surface treatment method of resin pellets. In this method, first, octadecyl isocyanate (1.0 equivalent in terms of the functional group) as a long-chain alkyl compound was polymerized with polyvinyl alcohol (degree of polymerization: 1,100, content of vinyl alcohol units: 98 mole %) as a saponified material of a polyvinyl acetate (co)polymer, to give a releasing agent component. Subsequently, this releasing agent component, an ethylene-acrylic acid copolymer as an acid-modified polyolefin copolymer and the like are put into water, and then heat-melted at 120 degrees centigrade in advance. Subsequently, its heat-melted material and water are uniformly emulsified and dispersed at 135 degrees centigrade, and cooled to give a desired aqueous releasing agent composition. With the use of such a method, it is possible to easily obtain resin pellets having excellent anti-blocking performance, without occurring separation, precipitation, clogging or the like even after obtaining a final product, and without deteriorating final performance of the final product.

RELATED DOCUMENTS

Patent Documents

Patent Document 1: Japanese Laid-Open Patent Publication No. Heil (1989)-288408
Patent Document 2: Japanese Laid-Open Patent Publication No. 2007-153979
Patent Document 3: Japanese Laid-Open Patent Publication No. 2008-248015
Patent Document 4: Japanese Laid-Open Patent Publication No. 2008-13727
Patent Document 5: Japanese Laid-Open Patent Publication No. Hei9(1997)-77890

DISCLOSURE OF THE INVENTION

However, according to the technology described in Patent Document 1, it is described that the stick temperature of the obtained resin pellets is 5 to 25 degrees centigrade although anti-blocking performance of resin pellets is improved. The stick temperature refers to a temperature which perfectly prevents blocking of pellets. Higher stick temperature make it easy handling because the temperature condition during storage of pellets is alleviated. Accordingly, in the technology of Patent Document 1, storage of resin pellets needs to control the temperature to equal to or less than room temperature (approximately 25 degrees centigrade). Therefore, in summer when a temperature increases, there is a problem of occurring blocking of resin pellets again if the storage temperature is not controlled by an air conditioner or the like, and re-grinding process before use is required.

When a volatile component resulting from unreacted raw material monomer or decomposition product is contained in resin pellets, the volatile component needs to be purged (removed). As one example of this purge operation, the resin pellets are exposed to a stream of air or inert gas. In this case, if the temperature of the stream is increased or the temperature of the resin pellet itself is increased, the volatile content in the resin pellets is easily escaped and the purge time is thus shortened. However, in the event that the stick temperature is equal to or less than room temperature, the temperatures thereof may not be increased, so that the resin pellets should be treated at a low temperature. Therefore, it is required several tens of hours or sometimes over hundreds of hours as the purge treatment time. Thus, there have been demanded resin pellets having a stick temperature which can reduce the purge time, that is, a high temperature exceeding room temperature as much as possible.

Patent Document 2 requires a large scale process in which EVA microparticles are attached many times during free feeding of resin pellets. This indicates that, attached EVA microparticles are easily detached simply by attaching EVA microparticles to pellets in a common method. As a solution to the problem, EVA microparticles are attached many times during free feeding. According to this method, it is found that EVA microparticles finally attached at the end of free feeding step might be easily detached and blocking of pellets might occur in the transportation and storage process after being transported from a silo storage step. Furthermore, the present inventors have reviewed this method and as a result, the stick temperature was also generally equal to or less than 25 degrees centigrade in the same manner as in Patent Document 1, so that storage of resin pellets was limited.

Also, in the technology described in Patent Document 3, there was a problem such that a resin powder layer to be applied on a copolymerized polyester resin was easily detached.

Also, in the technology described in Patent Document 4, there was a problem such that an emulsion polymer latex and a hardened tallow fatty acid attached to polymer particles were easily detached.

Furthermore, in the technology described in Patent Document 5, there was a problem such that a releasing agent component, an acid-modified polyolefin copolymer and the like were heat-melted, so that resin layers having a simple layer structure were formed on a resin base material, and resin layers were fused to each other.

Accordingly, in the above-described conventional technologies, blocking of resin pellets may not be fully suppressed, and the storage temperature of resin pellets was limited.

The present invention has been accomplished in view of the above circumstances, and an object of the present invention is to provide a resin pellet which prevents detachment of the microparticles to be covered on the resin base material and effectively suppresses blocking of resin pellets, and a method for producing the resin pellet.

According to the present invention, there is provided a resin pellet having a resin base material and a plurality of microparticles embedded in the resin base material, wherein the surface of the resin base material of the resin pellet is covered with the plurality of microparticles.

According to the present invention, there is also provided a method for producing a resin pellet including a step of preparing a resin base material and a step of embedding a plurality of microparticles in the resin base material, in which, in the step of embedding a plurality of microparticles in the resin base material, the surface of the resin base material is covered with the plurality of microparticles.

According to the present invention, a plurality of microparticles are embedded in the resin base material and the surface of the resin base material is covered with the microparticles. In this way, concavity and convexity are formed in the surface of the resin pellet while preventing detachment of microparticles from the resin base material. Accordingly, the contact area of resin pellets may be decreased, and blocking may be effectively suppressed.

By selecting a material having a softening temperature or melting point higher than that of the resin constituting the resin base material as microparticles, the resin base material to be a core such as a core-shell structure may be protected even at a temperature higher than the softening temperature of the resin base material.

According to the present invention, blocking of resin pellets is effectively suppressed. That is, blocking of resin pellets is effectively controlled even though resin pellets are stored or preserved at a high temperature.

As another effect in a preferred aspect, anti-adhesive microparticles to be applied on the surface of the resin base material are not detached even though they are transported by air in the pipe.

As still another effect, since resin pellets can be dried at a high temperature, the volatile component contained in the resin pellets may be removed in a short period of time. Accordingly, the time until the resin pellets having a volatile component in a small amount are shipped may be reduced, so that the productivity is improved. When the volatile component is removed before the molding process, the time required for drying and molding after receiving resin pellets is shortened, and a cycle from the step of receiving of resins to the step of molding is improved.

BRIEF DESCRIPTION OF THE DRAWINGS

The above and other objects, advantages and features of the present invention will be more apparent from the following description of certain preferred embodiments taken in conjunction with the accompanying drawings.

DESCRIPTION OF EMBODIMENTS

Figure 1:
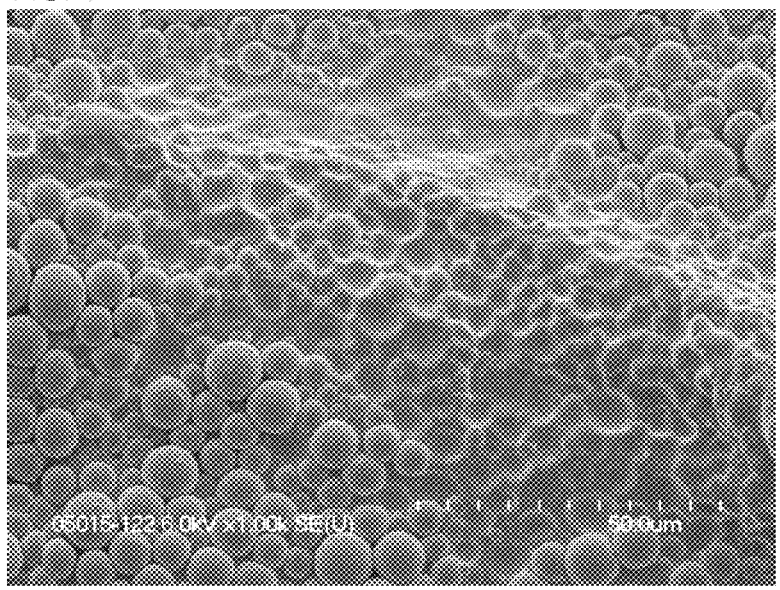
FIG. 1 is a view illustrating the results of Example.

Embodiments of the present invention will be illustrated with reference to the drawings below.

The resin pellet of this embodiment has a resin base material and a plurality of microparticles embedded in the resin base material. In this resin pellet, the surface of the resin base material is covered with a plurality of microparticles.

The aforementioned microparticles are dispersed in a liquid along with the resin base material keeping the original shape with at least its surface in a softened state. In this way, the microparticles may be embedded in the resin base material. Alternatively, as long as microparticles exhibit even a little adhesiveness, microparticles are brought into contact with the resin base material to make microparticles pseudo-bonded on the resin base material, and the resin base material can maintain the original shape although at least the surface of the resin base material is softened. Therefore, microparticles may also be embedded in the resin base material by heating at a temperature in which microparticles are not softened. Incidentally, in this embodiment, "softening" does not include a state in which the resin base material is melted such that the shape of the resin base material is not maintained.

The resin base material is a particle. Its shape may be spherical or oval-spherical. The particle diameter is not limited as long as it is a size used in a usual molding machine. It is usually 1 to 10 mm and the most commonly 2 to 5 mm. When it is 2 to 5 mm, handling properties are excellent, the time for purging the volatile content is also shortened because of large surface area, and a strong and dense microparticle layer which is not relatively easily detached may be formed on the surface.

The resin base material exhibits an effect of this embodiment more remarkably when an amorphous or low-crystalline thermoplastic resin is used. "Low-crystalline" mentioned herein refers to the degree of crystallinity determined by differential scanning calorimeter (DSC) of equal to or less than 30%, preferably equal to or less than 20% and particularly preferably equal to or less than 10%. The molecular weight of the thermoplastic resin may be good as long as it is a molecular weight enough to maintain its shape in a pellet form and hard to break on impact, and it is, for example, 0.1 to 1,000 g/10 min, preferably 0.1 to 500 g/10 min, and particularly preferably 0.5 to 200 g/10 min in terms of the melt flow rate (JIS K6924-2, 190 degrees centigrade, a load of 2,160 g.

When a thermoplastic resin having a softening temperature (Vicat softening point, JIS K7206) of equal to or less than 80 degrees centigrade, preferably equal to or less than 50 degrees centigrade, further preferably equal to or less than 30 degrees centigrade, and particularly equal to or less than standard room temperature, that is, 25 degrees centigrade is used, the resin base material exhibits an effect of the present invention more remarkably. The lower softening temperature is, the lower the stick temperature is. Therefore, cooling is required for storage, the purge gas temperature is also lowered and the purge time tends to be long. Thus, improvement effects of base material having the lower softening temperature are greater.

Specifically, the resin base material may be a copolymer of an ethylene monomer and a polar monomer selected from vinyl acetate, methyl acrylate, ethyl acrylate, butyl acrylate, methyl methacrylate and glycidyl methacrylate. In addition thereto, an ethylene-α-olefin copolymer that is a copolymer of ethylene and α-olefin having 3 to 10 carbon atoms (e.g. an ethylene-propylene copolymer, an ethylene-1-butene copolymer, an ethylene-1-hexene copolymer and an ethylene-1-octene copolymer having ethylene as a main component) exhibiting amorphous or low-crystalline behavior, or a propylene-α-olefin copolymer that is a copolymer of propylene and ethylene or α-olefin having 4 to 10 carbon atoms (e.g. a propylene-ethylene copolymer, a propylene-1-butene copolymer and the like having propylene as a main component) exhibiting amorphous or low-crystalline behavior, may be used. Herein, "amorphous" means that the melting peak is not measured by DSC. "Low-crystalline" means that the melting peak is found by DSC, and that the area ratio of the peak is equal to or less than 30% as compared to those exhibiting the maximum peak.

The resin base material is particularly preferably applied to an ethylene-polar monomer polymer that is a copolymer of ethylene and a polar monomer, and may further preferably be an ethylene-vinyl acetate copolymer. In this case, as the content of vinyl acetate in the ethylene-vinyl acetate copolymer is increased, the degree of crystallinity and the softening temperature are lowered, and the stick temperature tends to be lowered as well. In case of an ethylene-vinyl acetate copolymer having the content of vinyl acetate exceeding 40 mass % and ethylene of less than 60 mass %, the crystal melting peak is not observed on the basis of DSC, thus exhibiting amorphous. In case of an ethylene-vinyl acetate copolymer having the content of vinyl acetate of equal to or more than 20 mass % and equal to or less than 50 mass %, preferably 30 to 50 mass % and particularly 40 to 50 mass %, an effect of this embodiment is remarkably exhibited; therefore, it is preferable.

The resin base material can be produced by polymerization according to a known method in combination with the above monomers.

For example, the resin base material composed of an ethylene-vinyl acetate copolymer can be produced by using a radical polymerization method, an emulsion polymerization method or a solution polymerization method.

The microparticles preferably contain a resin component, are more preferably composed of a resin component as a main component, and are further preferably composed of a resin component. Furthermore, microparticles may be organic acid (salt) powder such as calcium stearate, or inorganic compound powder such as silica, talc or the like.

The microparticles in this embodiment may be dispersed in water. The average particle size of microparticles properly varies depending on the size of the resin base material to be covered. However, it is preferable that the average particle size is generally equal to or less than 20 μm and particularly equal to or less than 10 μm, because the surface of the resin base material can be densely covered with microparticles.

One of preferred aspects is that the shore hardness of microparticles (JIS K7215, needle penetration angle: 90 degrees, needle penetration speed: 0.8 mm/sec) is higher than the shore hardness of the resin base material. Specifically, the difference ($\Delta HS=HS_2-HS_1$) between the shore hardness ($HS_2$) of the microparticles and the shore hardness ($HS_1$) of the resin base material may be 30 to 100 and preferably 50 to 90.

When the microparticles contain a resin component, the shape of microparticles may be truly spherical or oval-spherical. In an extreme case, it may be irregularly polygonal. However, when it is polygonal, for example, the friction with the inner wall of the pipe becomes high when microparticles are transported in the pipe, and there is greater risk of causing detachment of microparticles even though they are embedded in the resin base material. Thus, the shape is preferably truly spherical or oval-spherical without having a corner.

Any resin component constituting the microparticles may be good as long as it is polyester, polyolefin, polyurethane or the like, is capable of being dispersed in water, or is capable of being dispersed in water with the use of a dispersion aid such as a surfactant or the like. The resin pellets in which the resin base material is covered with microparticles of the present invention are used for known melt molding or powder molding as it is. Therefore, it is preferable that the resin component constituting the microparticles is selected from resin components of the same or similar to the thermoplastic resin constituting the resin base material, because there can be no risk of damaging performance of a desired object to be molded that is the resin base material, or an effect on the physical properties due to the presence of the microparticle component can be controlled to a minimum.

For example, when the resin component of the resin base material is an ethylene polymer, an ethylene polymer may be used as the resin component contained in microparticles. In this way, an effect on the physical properties of the resin base material may be minimized. Of course, if microparticles are used as a resin additive such as silica, silica may be used as it is. In this way, it is also possible to exhibit an effect of preventing blocking in a state that resin pellets are strongly covered with silica or an effect as a slipping agent in a film after melt molding.

Further, as another example, it is preferable that an ethylene-vinyl acetate copolymer as the microparticles is used when the resin component of the resin base material is an ethylene-vinyl acetate copolymer because an effect on the physical properties of the resin base material may be minimized. The ethylene-vinyl acetate copolymer constituting the microparticles in this case may be selected among copolymers having the shore hardness ($HS_2$) which is higher than the shore hardness ($HS_1$) of the ethylene-vinyl acetate copolymer of the resin base material by 30 to 100 and preferably 50 to 90 as aforementioned. The shore hardness is described in a product catalog of each company, so that it is easy to select an appropriate product. Although there is a variation in the content of vinyl acetate in the ethylene-vinyl acetate copolymer depending on the polymerization method and polymerization apparatus, one of preferred aspects is that the content of vinyl acetate is generally equal to or less than 20 mass %, and preferably equal to or more than 5 mass % and less than 20 mass %, because an effect of this embodiment is remarkably exhibited. However, the kind of the ethylene-vinyl acetate copolymer constituting the microparticles is determined based on the relative relationship with the ethylene-vinyl acetate copolymer constituting the resin base material, so that a copolymer with the content of vinyl acetate of higher than 20 mass % may also be used in some cases.

One of preferred aspects is that the degree of crystallinity ($a_2$) of the resin component constituting the microparticles by the X-rays is higher than the degree of crystallinity ($a_1$) of the resin component constituting the resin base material by the X-rays. Specifically, it is preferable that the difference ($\Delta a = a_2 - a_1$) in the degrees of crystallinity is 15 to 35% and preferably 20 to 30%, because the quality of the resin pellets is less adversely influenced by a target final product of this embodiment. The molecular weight of the resin component constituting the microparticles is, for example, 10 to 500 g/10 min, preferably 50 to 300 g/10 min and particularly preferably 100 to 300 g/10 min in terms of the melt flow rate (JIS K6924-2, 190 degrees centigrade, a load of 2,160 g).

One or preferred aspects is that the Vicat softening point ($T_2$) of the resin component constituting the microparticles is higher than the Vicat softening point ($T_1$) of the resin component constituting the resin base material. Specifically, the difference ($\Delta T = T_2 - T_1$) in the Vicat softening points may be equal to or more than 3 degrees centigrade, preferably equal to or more than 10 degrees centigrade, and more preferably equal to or more than 15 degrees centigrade. Incidentally, when the Vicat softening point is equal to or less than the lower limit of a measuring device and it is not possible to measure the exact number, the difference in the Vicat softening points may be calculated with the use of the measurement lower limit. As described below, when the resin component constituting the microparticles is the same kind as that of the resin base material, the Vicat softening point can be controlled by the amount of the copolymer component. Within the temperature difference in the aforementioned range, the resin pellets after being covered with microparticles exhibit the target physical properties without practically damaging the physical properties of the resin base material.

Next, a method for producing a resin pellet of this embodiment will be described. The production method of this embodiment includes (1) a step of preparing a resin base material, (2) a step of embedding a plurality of microparticles in the resin base material and (3) a step of drying the resin pellets. The steps (2) and (3) herein may be continuously but separately carried out, or may be carried out at the same time.

First, it will be described about the step (1) of preparing a resin base material. A typical pellet-like resin base material is available by purchasing one of commercial products. In addition thereto, a pellet-like resin base material which has been pelletized by a commonly known polymer manufacturing process may be used.

Next, it will be described about the step (2) of embedding a plurality of microparticles in the resin base material. Herein, there is used a dispersion obtained by dispersing microparticles in a liquid. As the liquid, water is preferably used, and the liquid may contain a dispersion aid such as a surfactant or the like for the purpose of enhancing dispersibility and dispersion stability. Or, the liquid may contain an organic solvent typified by alcohols such as methanol, ethanol and the like. That is, water mentioned in this embodiment may also be a mixture of mainly composed of water with other component.

Stability of the microparticles in the dispersion is preferably excellent, and microparticles may be dispersed in water in a uniform and orderly manner.

As the aqueous dispersion, Chemipearl (registered trademark) manufactured by Mitsui Chemicals, Inc. may be used as it is, or by further being dispersed in water.

There are several brands of Chemipearl divided by the resin component constituting the dispersed microparticles, and there are specifically A series mainly composed of ethylene-α-olefin copolymer elastomer, M series mainly composed of polyethylene, V series mainly composed of an ethylene-vinyl acetate copolymer, S or SA series mainly composed of an ionomer, and W series mainly composed of low-molecular weight (wax) polyethylene or polypropylene.

When the resin base material is an amorphous or low-crystalline ethylene-α-olefin copolymer, the dispersion is selected from Chemipearl A series; in case of polyethylene, the dispersion is selected from Chemipearl M series; and in case of an ethylene-vinyl acetate copolymer, the dispersion is selected from Chemipearl V series, which are preferable combinations.

When the Vicat softening point is used as a guideline for selection, they can be examined by using a catalog of the company, selected and combined depending on the Vicat softening point of the resin base material. For example, the Vicat softening point of A100 is 60 degrees centigrade, that of A400 is 55 degrees centigrade, that of M200 is 75 degrees centigrade, that of S100 is 60 degrees centigrade, that of SA100 is 55 degrees centigrade, and that of V200 is 40 degrees centigrade.

Commonly used is a dispersion in which microparticles are dispersed in the range of 10 to 70 mass % relative to water. When the concentration of the dispersion is increased, the solution viscosity is increased, and handling properties and uniform dispersibility tend to be lost. Thus, microparticles are contained preferably in the range of 20 to 50 mass %, and particularly more preferably in the range of 30 to 40 mass %.

The thus-prepared dispersion and the resin base material are mixed. As the mixing amount, the amount of the dispersion is 0.001 to 20 times, and preferably 0.1 to 10 times of the total weight, when the total weight of the resin base material is 100.

Subsequently, a mixture of the dispersion and the resin base material is exposed to warm wind of air or inert gas, (far) infrared rays or the like, and heated. The heating temperature is higher than the softening temperature of the resin base material, and when the resin base material is a crystalline thermoplastic resin, it becomes lower than its melting point. When an ethylene-vinyl acetate copolymer is used as the resin base material and microparticles, the mixture may be heated such that the temperature of the resin pellet itself (hereinafter referred to as the pellet temperature) is 35 to 80 degrees centigrade, and preferably 40 to 60 degrees centigrade. A fluidized bed dryer, a vibrating dryer, an infrared dryer or the like may be used for heating. In this manner, the surface of the resin base material is softened, and the microparticles are embedded in the resin base material.

As one aspect of the method of mixing the resin base material and the dispersion, the resin base material may be added to the dispersion heated in advance and the mixture may be stirred. In this case, the temperature of the dispersion is higher than the softening temperature of the resin base material, and when the resin base material is a crystalline thermoplastic resin, it becomes lower than its melting point. Specifically, the temperature is properly selected by the combination of the softening temperature of the resin component constituting the resin base material and the softening temperature of the resin component in the dispersion. For example, in case of the ethylene-polar monomer copolymer such as an ethylene-vinyl acetate copolymer, it may be 35 to 80 degrees centigrade, and preferably 40 to 70 degrees centigrade. Such manner is more preferable because the surface of the resin base material may be softened without agglomerating the dispersion, and microparticles are easily embedded on the resin base material. The dispersion is 1 to 20 times and preferably 2 to 10 times, based on the total weight of the resin base material.

As another aspect of the method of mixing the resin base material and the dispersion, there may be a method including that the dispersion is supplied like a rotational flow along the side wall of the container into the resin base material present in the container, and the resin base material and the dispersion are come into contact with each other.

As another aspect, there may be a method including that the resin base material and the dispersion are supplied in the same direction like a rotational flow along the side wall of a cylindrical-shaped or triangular cone-shaped container at the same time, and the resin base material and the dispersion are come into contact with each other.

As further another aspect, there may be a method including that the dispersion is sprayed into the resin base material present in the container using a sprayer, and the resin base material and the dispersion are come into contact with each other.

According to these methods, microparticles may be attached on the resin base material with a small amount of the dispersion to be embedded. When the dispersion is equal to or less than the equivalent, preferably 0.001 to 0.5 times and further preferably 0.01 to 0.1 time, based on the total weight of the resin base material, an object of the present invention may also be achieved, and the drying time thereafter may also be shortened. Thus, it is favorable from the viewpoints of the productivity and energy saving.

Microparticles collide against the surface of the softened resin base material by dispersing microparticles and the softened resin base material in the liquid as described above, and then the surface of the resin base material having the viscosity from softening is pushed by microparticles. In this way, microparticles are embedded in the resin base material. The surface of the resin base material is in a softened state so that the viscosity is enhanced, and microparticles are embedded in the depth direction from the surface of the resin base material. Therefore, detachment of microparticles from the resin base material is suppressed.

In addition, in the aforementioned various methods, there is also used a method in which the resin base material and microparticles are come into contact with each other at normal temperature without heating, microparticles are attached on the resin base material simply by substantial point adhesion or point sticking, and microparticles are embedded in the resin base material and at the same time dried using the heat in the drying step to be continuously carried out.

This method is suitably applied particularly to microparticles exhibiting even a slight adhesiveness at normal temperature.

Next, it will be described about the step (3) of drying resin pellets.

In this embodiment, the resin pellets may be dried at a temperature in which the resin base material component is softened but the microparticle component is not softened, and drying by using warm wind or (far) infrared rays or the like may be adopted. In case of warm wind, air is used. When an organic solvent such as alcohol is used in the step of embedding microparticles, inert gas such as nitrogen or the like is preferably used. In this manner, the microparticles embedded in the resin base material are more firmly adsorbed and fixed on the resin base material.

Meanwhile, when the dispersion is used, the liquid accompanying microparticles may also be removed.

Furthermore, in case that the resin base material and microparticles are come into contact with each other at normal temperature in the aforementioned step, microparticles attached on the surface of the resin base material in a point adhesion state are firmly adsorbed and fixed on the resin base material.

When resin pellets are stored under the condition of, for example, a temperature of 25 to 35 degrees centigrade and particularly 25 to 30 degrees centigrade after drying under such dry conditions, microparticles are more firmly adsorbed and fixed on the resin base material depending on the storage time (the number of days). In this way, the surface of the resin base material is covered with a plurality of microparticles.

Microparticles obtained by the air drying or cold wind are simply attached on the surface of the resin base material, and less likely to be embedded on the surface of the resin base material. Of course, if the softening temperature of the resin base material is equal to or less than normal temperature, the microparticle component may possibly be firmly attached by spending time for air drying. However it is not practical in consideration of the productivity.

Figure 3:
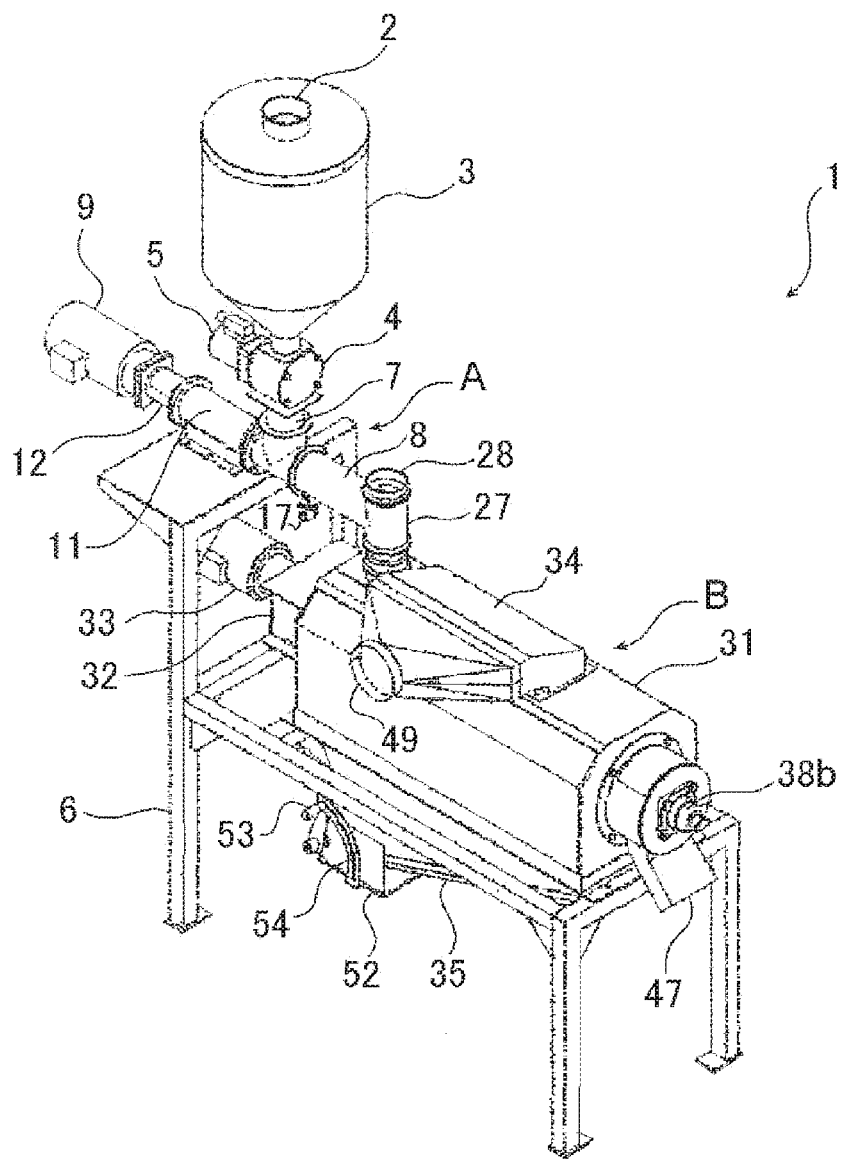
FIG. 3 is an example of a device used for the production of resin pellets according to the embodiment.

Meanwhile, in the method for producing pellets of this embodiment, for example, a device illustrated in FIG. 3 may be used. FIG. 3 is a schematic perspective view regarding a pellet producing device 1. In the pellet producing device 1, a stirring conveyance chamber 8 consisting of a cylindrical shell and a dry section B consisting of an air permeable cylindrical screen are respectively laterally arranged. In the dry section B, a main shaft and a stirring blade driven to rotate around the shaft center of the main shaft are rotatably installed.

Hereinafter, the method for producing rein pellets of this embodiment using the pellet producing device 1 will be described in detail with reference to FIG. 3. First, (1) the aforementioned step is carried out, and the obtained pelletized resin base material is put into a hopper 3 from a supply port 2. A predetermined amount of the resin base material is continuously supplied to the stirring conveyance chamber 8 of a covering section A by means of a rotary valve 4. In the stirring conveyance chamber 8, the pellet-like resin base material is conveyed in the longitudinal direction of the stirring conveyance chamber 8 with stirring by a stirring conveyance means such as a single thread roll. The stirring conveyance chamber 8 is provided with a nozzle 17, the dispersion obtained by dispersing microparticles in a liquid is sprayed on the resin base material from the nozzle 17, and accordingly the surface of the resin base material is covered with microparticles.

Herein, when the resin base material and microparticles are come into contact with each other in the stirring conveyance chamber 8, it is preferable to heat the mixture at a temperature in which the resin base material component is softened but the microparticle component is not softened. In this way, attachment (non-detachment) of microparticles to the resin base material may be improved. Specifically, it is preferable that the resin base material and microparticles are come into contact with each other at equal to or more than the softening temperature of the resin base material component, in case of a crystalline thermoplastic resin used as the resin base material, at equal to or less than the melting point and equal to or less than the softening temperature of the microparticle component. For example, the pelletized resin base material may be heated in advance in the range of less than the temperature for melting it at a temperature for softening the resin base material, and supplied to the stirring conveyance chamber 8. In this case, for example, by mechanically heating the inside of the hopper 3 and the rotary valve 4, the resin base material may be heated. The heating temperature at this time may be equal to or more than the softening temperature of the resin base material component, in case of a crystalline thermoplastic resin used as the resin base material component, may be equal to or less than its melting point. For example, when the resin base material is an ethylene-polar monomer copolymer, the heating temperature may be 30 to 90 degrees centigrade and preferably 50 to 80 degrees centigrade.

In order to improve attachment (non-detachment) of the microparticles to the resin base material, the aforementioned dispersion to be sprayed from the nozzle 17 may be heated in advance. In this case, the liquid in which microparticles are dispersed is preferably heated at a temperature in which microparticles are not softened. The specific heating temperature is automatically determined depending on the softening temperature of the resin component constituting the microparticles. It is required to be less than the boiling point of the liquid for dispersing microparticles due to a dispersion liquid form. For example, in case of the ethylene-polar monomer copolymer, the liquid may be heated at a temperature of preferably 30 to 90 degrees centigrade and more preferably 50 to 80 degrees centigrade. Incidentally, as the liquid for dispersing microparticles, water is preferably used, and the liquid may contain a dispersion aid such as a surfactant or the like, or may contain alcohols such as methanol, ethanol and the like.

The resin base material thus covered with microparticles is discharged from the stirring conveyance chamber 8 and diffused in a conveyance path 27. The resin base material covered with microparticles and diffused in the conveyance path 27 is contacted with warm wind with stirring while being conveyed in the longitudinal direction of the dry section B by means of the stirring blade arranged in the dry section B. In this case, warm wind is supplied from a hot wind supply port 28. In this way, the surface of the resin base material covered with microparticles may be dried. Warm wind is supplied from the aforementioned hot wind supply port 28, and examples of warm wind include, for example, air heated to 35 to 80 degrees centigrade, and inert gas such as nitrogen or the like. In this manner, the surface area of the resin base material is softened or melted, and microparticles may be embedded in the surface of the resin base material.

In order to improve attachment (non-detachment) of the microparticles to the resin base material, the conveyance path 27 may be mechanically heated. In this case, the heating temperature may be equal to or more than room temperature, and may be, for example, a temperature in which the resin base material component is softened and microparticles are not softened. Furthermore, the temperature may be properly controlled in relation to the retention time in the conveyance path 27.

Subsequently, the resin base material covered with microparticles is discharged from an outlet 47 and cooled to form resin pellets of this embodiment. Cooling may be carried out by, for example, immersing it in a liquid, spraying a liquid, or coming into contact with cold wind. When a liquid is sprayed, water is preferably used as the spraying liquid. The liquid may contain a dispersion aid such as a surfactant or the like, or may contain alcohols such as methanol, ethanol and the like. When a liquid is sprayed, in addition to an effect of the liquid to be sprayed directly contributing to cooling, a cooling effect is also expected by evaporation by the heat of resin pellets and removing the latent heat of vaporization. Examples of cold wind include, for example, cold air, and inert gas such as nitrogen or the like. The cooling temperature is reduced by preferably 5 degrees centigrade or less, and more preferably 10 degrees centigrade or less, as compared the softening temperature of the resin base material component. By cooling in this manner, microparticles may be firmly attached to the resin base material by residual heat of resin pellets, and detachment of the microparticles from the resin base material may be prevented.

According to the production method using the pellet producing device 1, the aforementioned step (2) of embedding microparticles in the resin base material and the aforementioned step (3) of drying the resin pellets may be carried out continuously or at the same time in a parallel manner, so that resin pellets of this embodiment can be more efficiently produced.

Figure 4:
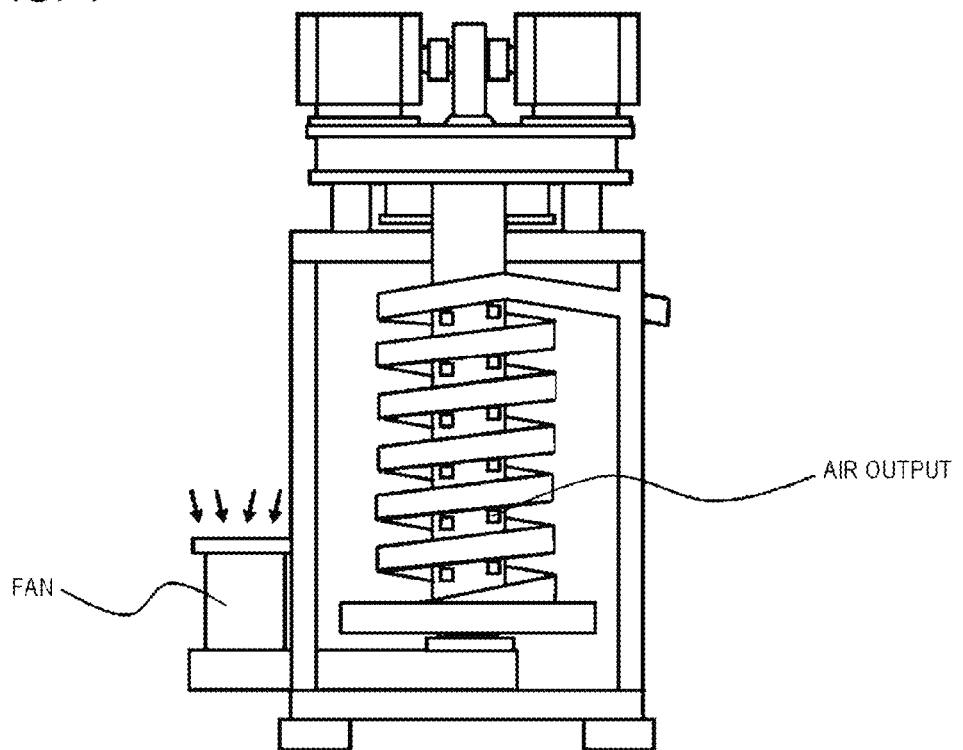
FIG. 4 is an example of a device used for the production of resin pellets according to the embodiment.

In the step (3) of drying the resin pellets in the method of this embodiment for producing pellets, for example, one of vibrating dryers illustrated in FIG. 4, that is, a spiral elevator (also referred to as the vertical spiral conveyor) may be used.

The resin pellets on the spiral elevator are exposed to warm wind and heated to 30 to 80 degrees centigrade as in the aforementioned device. According to this spiral elevator, advantage that the retention time is prolonged by extending the height of the device in the vertical direction can be obtained. When the retention time is prolonged in the drying step, the temperature of warm wind may be lowered, and microparticles may be more firmly attached to the resin base material, for example, by warm wind of 20 to 75 degrees centigrade and preferably 30 to 50 degrees centigrade. In this case, the device is also distinctive in that drying can be made by sending air without heating under weather conditions, and drying can be made with energy saving because the heating temperature is also lowered. Furthermore, the combined advantage that the installation area is small and the retention time is prolonged can be also obtained to be combined. As warm wind blowing into the spiral elevator, air or inert gas such as nitrogen or the like may be used. In this way, attachment (non-detachment) of microparticles to the resin base material may be improved.

Next, an operational effect of this embodiment will be described. According to this embodiment, a plurality of microparticles are embedded in the resin base material and the surface of the resin base material is covered with microparticles. Accordingly, detachment of microparticles from the resin base material is prevented, and unevenness is formed on the surface of the resin pellets. Accordingly, the contact area between resin pellets may be reduced, and blocking may be effectively suppressed.

Furthermore, a non-blocking material is used as the component constituting the microparticles, so that blocking may be effectively inhibited.

Furthermore, the softening temperature (melting point or sublimating temperature) of microparticles to be applied on the surface is higher than that of the resin base material, so that drying can be made in an environment having a temperature of equal to or more than the softening temperature of the resin base material and less than the softening temperature of the microparticle component. Therefore, the volatile component such as residual monomers contained in the resin base material may be quickly removed.

While the embodiments of the present invention have been described above with reference to the drawings, the disclosures are presented for the purpose of illustrating the present invention, and various constructions other than those described above are also available.

EXAMPLES (1) Evaluation of Physical Properties of Resin Pellet
  i) Melt flow rate (MFR): JIS K7219-1999 (temperature condition: 190 degrees centigrade, load: 2,160 g
  ii) Vicat softening point: JIS K7206-1999 (measurement lower limit: 25 degrees centigrade)
  iii) Shore hardness: JIS K7215-1986
  iv) Vinyl acetate content: JIA K 7192-1999
  v) Degree of crystallinity: X-ray diffraction method
(2) Evaluation of Embeddability of Particles
The surface and cross section of the prepared resin pellets were observed with an electron microscope, and embeddability was determined with the attachment state of particles.
  A: Particles were attached almost all over the surface of pellets.
  B: Particles were attached on the surface of pellets, but some of particles were detached.
  C: Attachment of particles was not observed on the most of the surface of pellets.
  D: Attachment of particles was not observed on the surface of pellets.

Example 1

An aqueous dispersion (solid content concentration: 40 mass %) was prepared by dispersing microparticles composed of an ethylene-vinyl acetate copolymer having the content of vinyl acetate of 19 mass %, MFR of 150 g/10 min, a Vicat softening point of 42 degrees centigrade, a shore hardness of 86 and the degree of crystallinity of 26. 500 g of the aqueous dispersion was heated to 45 degrees centigrade, and 100 g of pellets (pellet temperature: 15 degrees centigrade) was added thereto, and the aqueous dispersion and pellets were contacted under stirring for 30 seconds. The pellets were composed of an ethylene-vinyl acetate copolymer having the content of vinyl acetate of 46 mass %, MFR of 100 g/10 min, a Vicat softening point of equal to or less than 25 degrees centigrade ($\Delta T \geq 17$), a shore hardness of 16 ($\Delta HS$: 70) and the degree of crystallinity of 0% ($\Delta a$: 26%) as a resin base material. Subsequently, the obtained resin pellets were cooled in cold water of 10 degrees centigrade and then dried at normal temperature (25 degrees centigrade).

Example 2

Figure 2:
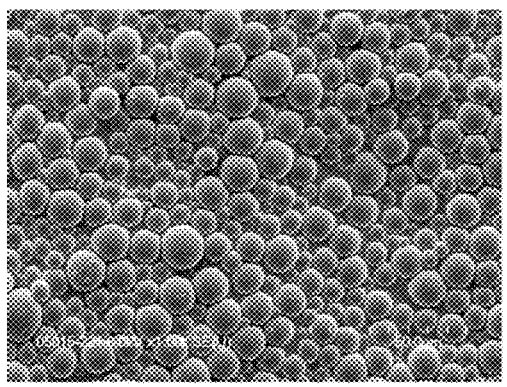
FIG. 2 is a view illustrating the results of Example.
Figure 2:
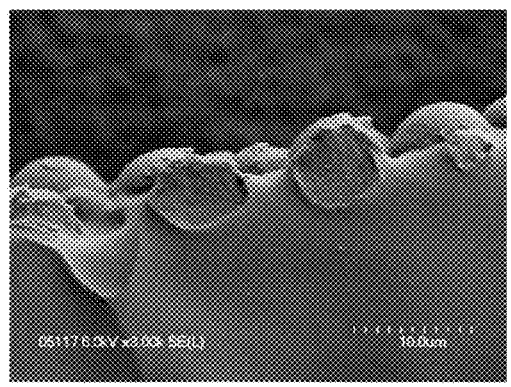

To 10 kg of pellets (pellet temperature: 20 degrees centigrade) was added 300 g (corresponding to 0.03 times relative to total weight of base material) of an aqueous dispersion (solid content concentration: 40 mass %), and the resulting mixture was heated until the pellet temperature became 30, 40 and 50 degrees centigrade respectively. The pellets were composed of an ethylene-vinyl acetate copolymer having the content of vinyl acetate of 46 mass %, MFR of 100 g/10 min, a Vicat softening point of equal to or less than 25 degrees centigrade, a shore hardness of 16 and the degree of crystallinity of 0% as a resin base material, while the aqueous dispersion was prepared by dispersing microparticles composed of an ethylene-vinyl acetate copolymer having the content of vinyl acetate of 19 mass %, MFR of 150 g/10 min, a Vicat softening point of 42 degrees centigrade ($\Delta T \geq 17$), a shore hardness of 86 ($\Delta HS$: 70) and the degree of crystallinity of 26% ($\Delta a$: 26%). The mixture was heated by coming into contact with air heated to 70 degrees centigrade using a fluidized bed dryer or a vibrating dryer (spiral elevator), or by putting into an infrared dryer regulated to 70 degrees centigrade. Subsequently, the obtained resin pellets were cooled in cold water of 10 degrees centigrade, and the pellet temperature was confirmed to be equal to or less than 20 degrees centigrade, and then the resin pellets were dried at normal temperature (25 degrees centigrade). The obtained resin pellets were observed with an electron microscope to evaluate embeddability of particles. The results are shown in Table 1. FIG. 1 illustrates an electron microscope picture on the surface of resin pellets prepared by heating to 40 degrees centigrade of the pellet temperature, while FIG. 2(a) illustrates an electron microscope picture on the surface of resin pellets prepared by heating to 50 degrees centigrade, and FIG. 2(b) illustrates a picture of the cross-sectional surface of them. The average particle size of microparticles was examined using the results from FIGS. 1 and 2, and as a result, it was equal to or less than 20 μm.

TABLE 1

| Pellet temperature | Evaluation of embeddability (warm air) | Evaluation of embeddability (infrared rays) |
|---|---|---|
| 30 degrees centigrade | C | C |
| 40 degrees centigrade | B | B |
| 50 degrees centigrade | A | A |

Example 3

To 100 g of pellets (pellet temperature: 15 degrees centigrade) was added 3 g (corresponding to 0.03 times relative to total weight of base material) of an aqueous dispersion (solid content concentration: 40 mass %), and the resulting mixture was allowed to stand in an oven at a temperature of 45 degrees centigrade and a humidity of 30% for 15, 30, 45, 50 and 60 minutes respectively. The pellets were composed of an ethylene-vinyl acetate copolymer having the content of vinyl acetate of 46 mass %, MFR of 100 g/10 min, a Vicat softening point of equal to or less than 25 degrees centigrade, a shore hardness of 22 and the degree of crystallinity of 0% as a resin base material, while the aqueous dispersion was prepared by dispersing microparticles composed of an ethylene-vinyl acetate copolymer having the content of vinyl acetate of 19 mass %, MFR of 150 g/10 min, a Vicat softening point of 42 degrees centigrade ($\Delta T \geq 17$), a shore hardness of 86 ($\Delta HS$: 64) and the degree of crystallinity of 26% ($\Delta a$: 26%). The temperatures of resin pellets were respectively measured over a predetermined period of time. Subsequently, the obtained resin pellets were cooled in cold water of 10 degrees centigrade, and the pellet temperature was confirmed to be equal to or less than 20 degrees centigrade, and then the resin pellets were dried at normal temperature (25 degrees centigrade). The obtained resin pellets were observed with an electron microscope to evaluate embeddability of particles. The results are shown in Table 2.

TABLE 2

| Time to allow to stand | Pellet temperature | Evaluation of embeddability |
|---|---|---|
| After 15 minutes | 36.7 degrees centigrade | C |
| After 30 minutes | 39.6 degrees centigrade | C |
| After 45 minutes | 40.9 degrees centigrade | B |
| After 50 minutes | 41.3 degrees centigrade | A |
| After 60 minutes | 41.5 degrees centigrade | A |

Example 4

To 10 kg of pellets (pellet temperature: 15 degrees centigrade) was added 300 g (corresponding to 0.03 times relative to total weight of base material) of an aqueous dispersion (solid content concentration: 40 mass %), and the resulting mixture was heated until the pellet temperature became 50 degrees centigrade. The pellets were composed of an ethylene-vinyl acetate copolymer having the content of vinyl acetate of 41 mass %, MFR of 63 g/10 min, a Vicat softening point of equal to or less than 25 degrees centigrade, a shore hardness of 40 and the degree of crystallinity of 0% as a resin base material, while the aqueous dispersion was prepared by dispersing microparticles composed of an ethylene-vinyl acetate copolymer having the content of vinyl acetate of 19 mass %, MFR of 150 g/10 min, a Vicat softening point of 42 degrees centigrade ($\Delta T \geq 17$), a shore hardness of 86 ($\Delta HS$: 46) and the degree of crystallinity of 26% ($\Delta a$: 26%). The mixture was heated by coming into contact with warm air of 70 degrees centigrade using a fluidized bed dryer or a vibrating dryer (spiral elevator), or by putting into an infrared dryer regulated to 70 degrees centigrade. Subsequently, the obtained resin pellets were cooled in cold water of 10 degrees centigrade, and the pellet temperature was confirmed to be equal to or less than 20 degrees centigrade, and then the resin pellets were dried at normal temperature (25 degrees centigrade). The embeddability of particles was evaluated and as a result, in any method of using a fluidized bed dryer, a vibrating dryer and an infrared dryer, microparticles were attached on the whole surface of resin pellets in the state that some of microparticles were embedded. Evaluation of embeddability was indicated as "A".

Example 5

To 10 kg of pellets (pellet temperature: 15 degrees centigrade) was added 150 g (corresponding to 0.015 times relative to total weight of base material) of an aqueous dispersion (solid content concentration: 40 mass %), and the resulting mixture was heated up to 60 degrees centigrade. The pellets were composed of an ethylene-vinyl acetate copolymer having the content of vinyl acetate of 46 mass %, MFR of 2.5 g/10 min, a Vicat softening point of equal to or less than 25 degrees centigrade, a shore hardness of 28 and the degree of crystallinity of 0% as a resin base material, while the aqueous dispersion was prepared by dispersing microparticles composed of an ethylene-vinyl acetate copolymer having the content of vinyl acetate of 19 mass %, MFR of 150 g/10 min, a Vicat softening point of 42 degrees centigrade ($\Delta T \geq 17$), a shore hardness of 86 ($\Delta HS$: 58) and the degree of crystallinity of 26% ($\Delta a$: 26%). The mixture was heated by coming into contact with warm air of 80 degrees centigrade using a fluidized bed dryer, by coming into contact with warm air of 70 degrees centigrade using a vibrating dryer (spiral elevator), or by putting into an infrared dryer regulated to 80 degrees centigrade. Subsequently, the obtained resin pellets were cooled in cold water of 10 degrees centigrade, and the pellet temperature was confirmed to be equal to or less than 20 degrees centigrade, and then the resin pellets were dried at normal temperature (25 degrees centigrade). The embeddability of particles was evaluated and as a result, in any method of using a fluidized bed dryer, a vibrating dryer (spiral elevator) and an infrared dryer, microparticles were attached on the whole surface of pellets in the state that some of microparticles were embedded. Evaluation of embeddability was indicated as "A".

Example 6

To 10 kg of pellets (pellet temperature: 15 degrees centigrade) was added 150 g (corresponding to 0.015 times relative to total weight of base material) of an aqueous dispersion (solid content concentration: 40 mass %), and the resulting mixture was heated up to 60 degrees centigrade. The pellets were composed of an ethylene-vinyl acetate copolymer having the content of vinyl acetate of 41 mass %, MFR of 2.0 g/10 min, a Vicat softening point of equal to or less than 25 degrees centigrade, a shore hardness of 45 and the degree of crystallinity of 0% as a resin base material, while the aqueous dispersion was prepared by dispersing microparticles composed of an ethylene-vinyl acetate copolymer having the content of vinyl acetate of 19 mass %, MFR of 150 g/10 min, a Vicat softening point of 42 degrees centigrade ($\Delta T \geq 17$), a shore hardness of 86 ($\Delta HS$: 41) and the degree of crystallinity of 26% ($\Delta a$: 26%). The mixture was heated by coming into contact with warm air of 80 degrees centigrade using a fluidized bed dryer or a vibrating dryer (spiral elevator), or by putting into an infrared dryer regulated to 80 degrees centigrade. Subsequently, the obtained resin pellets were cooled in cold water, and the pellet temperature was confirmed to be equal to or less than 20 degrees centigrade, and then the resin pellets were dried at normal temperature (25 degrees centigrade). The embeddability of particles was evaluated and as a result, in any method of using a fluidized bed dryer, a vibrating dryer and an infrared dryer, microparticles were attached on the whole surface of pellets in the state that some of microparticles were embedded. Evaluation of embeddability was indicated as "A".

Reference Example

To 10 kg of pellets (pellet temperature: 15 degrees centigrade) was added 300 g (corresponding to 0.03 times relative to total weight of base material) of an aqueous dispersion (solid content concentration: 40 mass %), and the resulting mixture was dried at normal temperature (25 degrees centigrade). The pellets were composed of an ethylene-vinyl acetate copolymer having the content of vinyl acetate of 46 mass %, MFR of 100 g/10 min, a Vicat softening point of equal to or less than 25 degrees centigrade, a shore hardness of 16 and the degree of crystallinity of 0% as a resin base material, while the aqueous dispersion was prepared by dispersing microparticles composed of an ethylene-vinyl acetate copolymer having the content of vinyl acetate of 19 mass %, MFR of 150 g/10 min, a Vicat softening point of 42 degrees centigrade ($\Delta T \geq 17$), a shore hardness of 86 ($\Delta HS$: 70) and the degree of crystallinity of 0% ($\Delta a$: 26%).

Evaluation of Blocking

With respect to resin pellets prepared in Reference Example and resin pellets prepared in the above Examples 1 to 3, the stick temperatures were compared, and blocking of respective resin pellets was evaluated.

A cylindrical metal container with its inner surface having a diameter of 40 mm and a height of 70 mm, and the inner surface which is coated with Teflon (registered trademark) was allowed to stand in an oven set to any temperature in advance for 30 minutes, and then the resin pellets were put up to a height of 55 mm from the bottom of the container and allowed to stand for 30 minutes. After 30 minutes, the metal container was taken out from the oven, and a load of 40.2 N was applied on the resin pellets for 1 hour using a metal weight having an inner diameter slightly smaller than that of the metal container. Thereafter, the load was removed and the metal container was put upside down. Then, falling state of the pellets was visually observed, and the container was back to the original state after 1 minute and the inside of the container was visually observed. When clusters of a plurality of resin pellets remained inside the container, it was evaluated that sticking was caused. This experiment was carried out in increments of 2.5 degrees centigrade, whereby the temperature in which the presence and absence of sticking were distinguished at 2.5 degrees centigrade was taken as the stick temperature. The results are shown in Table 3.

TABLE 3

|  | Stick temperature |
| --- | --- |
| Reference Example | 24 degrees centigrade |
| Example 1 | 30 degrees centigrade |
| Example 2 | 27 to 30 degrees centigrade |
| Example 3 | 27 to 30 degrees centigrade |

As shown in Examples above, it is found that the resin pellet of the present invention has a resin base material and a plurality of microparticles embedded in the resin base material, wherein the surface of the resin base material is covered with the plurality of microparticles. As a result, it is found that microparticles obtained according to the conventional method have the stick temperature increased by 3 to 6 degrees centigrade, as compared to resin pellets attached without being embedded in the resin base material. Thus, by increasing the stick temperature, storage conditions and handling conditions of the resin pellets are eased and in addition thereto, the production time can also be reduced.

The invention claimed is:

1. A method for producing a resin pellet comprising:
preparing a resin base material;
embedding a plurality of microparticles in said resin base material by dispersing, in a liquid comprising water, said resin base material in a softened state and said microparticles; and
drying the resin base material in which the plurality of microparticles are embedded, to remove the liquid comprising the water,
wherein,
a shore hardness of said microparticles is higher than a shore hardness of said resin base material, the shore hardness being measured according to JIS K7215,
a degree of crystallinity of said microparticles is higher than a degree of crystallinity of said resin base material, the degree of crystallinity being measured by an X-ray diffraction method,
a Vicat softening point of said microparticles is higher than a Vicat softening point of said resin base material, the Vicat softening point being measured according to JIS K7206,
said resin base material contains an ethylene-vinyl acetate copolymer, a content of vinyl acetate in said ethylene-vinyl acetate copolymer contained in said resin base material is 20 to 50 mass %,
said microparticles contain an ethylene-vinyl acetate copolymer, a content of vinyl acetate in said ethylene-vinyl acetate copolymer contained in said microparticles is 5 to 20 mass %, and
in embedding said plurality of microparticles in said resin base material, the surface of said resin base material is covered with said plurality of microparticles.

2. The method for producing a resin pellet according to claim 1,
wherein, in embedding said plurality of microparticles in said resin base material, said resin base material comes into contact with said microparticles at a temperature of equal to or more than 35 degrees centigrade and equal to or less than 80 degrees centigrade.

3. The method for producing a resin pellet according to claim 1, wherein both said resin base material and said microparticles are consisting of an ethylene-vinyl acetate copolymer.

4. The method for producing a resin pellet according to claim 1, wherein the average particle size of said microparticles is equal to or less than 20 μm.

5. The method for producing a resin pellet according to claim 1, wherein said resin base material is a particle.

6. The method for producing a resin pellet according to claim 1, wherein in embedding said plurality of microparticles in said resin base material, an amount of said microparticles and the liquid is 0.001 to 20 times when the total weight of the resin base material is 100.

7. The method for producing a resin pellet according to claim 1, wherein in embedding said plurality of microparticles in said resin base material, a dispersion in which said microparticles are dispersed in the water is used, and
an amount of the dispersion is 0.001 to 20 times when the total weight of the resin base material is 100.

8. The method for producing a resin pellet according to claim 1, wherein in embedding said plurality of microparticles in said resin base material, a dispersion in which said microparticles are dispersed in the range of 10 to 70 mass % relative to the water is used, and
an amount of the dispersion is 0.001 to 20 times when the total weight of the resin base material is 100.

* * * * *